June 9, 1964 D. E. COOPER 3,136,837
MELTING CONSUMABLE ELECTRODES
Filed March 21, 1962 2 Sheets-Sheet 1

INVENTOR.
Donald E. Cooper
BY
*Clement Allen*
Agent

3,136,837
MELTING CONSUMABLE ELECTRODES
Donald E. Cooper, Las Vegas, Nev., assignor to Titanium Metals Corporation of America, New York, N.Y., a corporation of Delaware
Filed Mar. 21, 1962, Ser. No. 181,407
5 Claims. (Cl. 13—9)

This invention relates to melting consumable electrodes in a cold mold type arc furnace employing multi-phase alternating electric current for melting power.

Direct current has heretofore been most generally used as melting power in consumable electrode arc melting furnaces. One pole of a source of high amperage direct current has been connected to the electrode to be melted and the other pole has been connected to the pool of molten metal in a cooled crucible, generally by electrical connection to the crucible itself. Suitable electrode drive means are employed to gradually lower the electrode as it becomes reduced in length and its metal melted and transferred to the crucible, such drive means being controlled by electrical means responsive to some characteristic of the arc so that the melting rate of the electrode is maintained more or less constant or at desired rates during different phases of the melting operation.

When employing multi-phase alternating current for melting power, problems are encountered which are not present when melting single electrodes by means of direct current. Employing three electrodes, for example, with each electrode connected to one phase of a three-phase alternating current power supply, there is a tendency for one electrode to "burn off" or melt at a rate faster than the other two electrodes. This occurs because one phase of a three-phase alternating current source often carries higher amperage than the other two phases. If each electrode is individually driven and controlled by reference to a characteristic of the arc between it and the pool of molten metal, it is difficult, if not impossible to program the individual electrode melting rates with relation to their individual arc characteristics so that at the end of the melt each electrode is essentially entirely consumed and only short uniform stubs remain unmelted.

It is therefore a principal object of this invention to provide a method for equalizing the average melting rate of a trio of consumable electrodes melted in an arc furnace by three-phase alternating current. Another object of this invention is to provide an improved assembly of a trio of electrodes to be melted in an arc furnace by three-phase alternating current. A further object of this invention is to provide means for producing an equalized average melting rate of a trio of electrodes melted in an arc furnace by three-phase alternating current. These and other objects of this invention will be apparent from the following description and from the annexed drawings in which:

Figure 1:
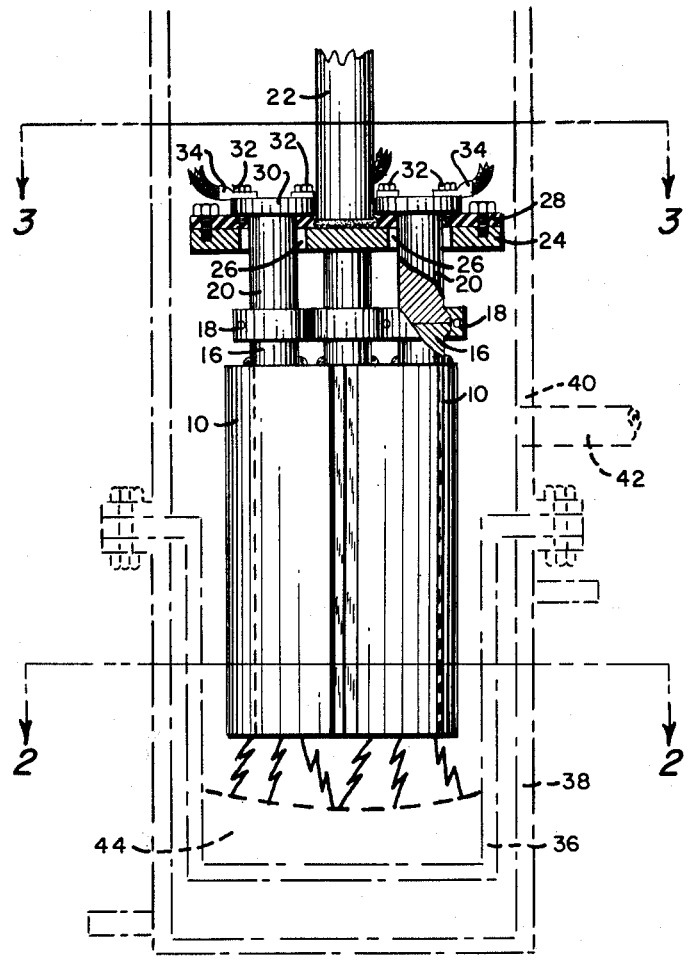
FIG. 1 shows a general side view of an electrode assembly embodying features of this invention.
Figure 2:
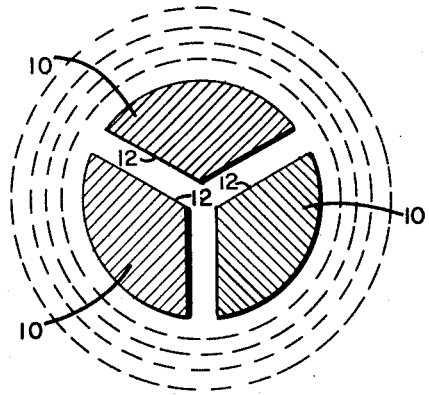
FIG. 2 shows a section of the assembly of FIG. 1 taken along the line 2—2.
Figure 3:
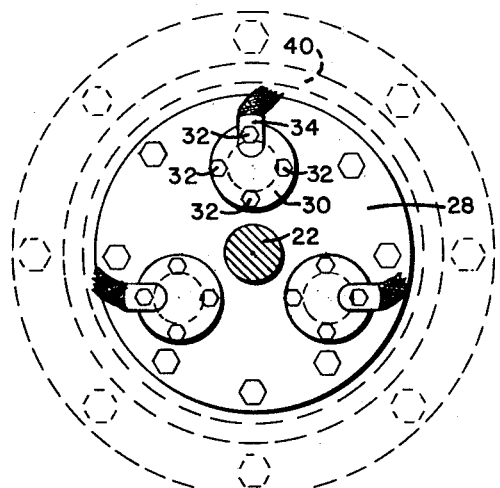
FIG. 3 shows a section of the assembly of FIG. 1 taken along the line 3—3.

Referring now to FIGS. 1, 2 and 3, the electrode assembly comprises a trio of metallic consumable electrodes 10, which are preferably of sector-shaped cross section as will be seen more clearly in FIG. 2. The electrodes 10 are arranged in a cluster with their flat sides 12 in face to face relationship, and spaced apart a sufficient distance to prevent short-circuiting. The tops of electrodes 10 are provided with suitable stubs 16 by which they are fixedly attached, as by clamp members 18 to rods 20.

An electrode drive ram 22 is provided with horizontal plate 24 fixedly attached as by welding to its bottom. Apertures 26 are provided in plate 24 through which rods 20 pass with sufficient clearance to prevent short-circuiting. Above plate 24 is fixedly attached insulating plate 28 to which the upper flanges 30 of rods 20 are attached as by bolts 32. Thus, electrodes 10 are fixedly attached by their tops to a common support element, plate 24, and when plate 24 is moved up or down by action of drive ram 22, the tops of electrodes 10 will be maintained in substantially their original horizontal plane relationship. In addition, the tops of electrodes 10 are insulated from each other and from plate 24. A power lead, one from each phase of a three-phase alternating current power supply, is connected to each of electrodes 10 as by means of terminal 34 which is held firmly in electrical contact with flange 30 by one of bolts 32.

Ram 22 will be actuated by suitable and conventional mechanism, not shown, and its speed and upward and downward movement may be controlled by suitable electrical systems which are available and well-known to those skilled in the art. The electrode assembly will thus be lowered into a crucible 36 of the cold mold type, which is shown mounted inside the bottom part of a furnace housing 38 with the space between being employed as a cooling jacket by circulation of a cooling liquid therethrough. An upper portion of the furnace housing is shown at 40, and since operation of the furnace under high vacuum or inert gas is often desirable, a suitable pipe for connection to a vacuum pumping system or source of inert gas is shown at 42.

With each individual electrode 10 connected to a phase of a three-phase alternating power supply, an arc will play between the bottoms of electrodes 10 and a pool of molten metal 44 in crucible 36 to produce progressive melting of electrodes 10.

The electrode assembly of this invention operates on an interesting principle which is dependent on employment of the trio of electrodes connected to a three-phase alternating current power supply. As is well-known, when the distance between the bottom of a consumable electrode and the pool of molten metal is shortened the voltage across the arc decreases, the current flow increases, and the melting rate of the consumable electrode metal is also increased. In the case of the present invention wherein the three electrodes are fixedly attached to a common support, they are moved up or down by the driving ram as a unit. If one of the phases of the alternating current carries more current than the others (and this often occurs) the electrode connected to that phase will tend to melt at a faster rate. As it does so its length is shortened and its bottom tends to be spaced a greater distance from the surface of the pool of molten metal in the crucible. However, when this occurs the bottoms of the other two electrodes will be relatively closer to the metal pool and their arc lengths shorter and as a result more current will flow between them and the metal pool and their melting rates will be correspondingly increased. Thus, any temporary shortening of one electrode compared with the other two will result in an increase in melting rate of the other two so that the average melting rates of each of the electrodes becomes equalized and the lengths of the electrodes is maintained more or less equal during the melting operation. The compensation for any tendency for any one of the trio of electrodes to melt at a faster rate than the others is therefore automatic.

In operation of the electrode assembly, the top stubs 16 of a trio of electrodes 10 of metal to be melted are clamped by clamps 18 to rods 20 which are in turn bolted by their flanges 30 to insulating plate 28. Attachment of insulating plate 28 to plate 24 which is connected to drive ram 22 provides an assembly of the three electrodes to be actuated as a unit. The assembly is arranged in a suitable cold mold type arc furnace, in whose bottom part 38 is a cold mold or crucible 36. A supply of three-phase electric current is employed for melting power by connecting one phase to each of electrodes 10 through connector terminal 34. An arc is struck, preferably initiated through loose metal or a striker plate at the bottom of crucible 36, and maintained by suitable gradual lowering of the electrode assembly as the metal of electrodes 10 becomes progressively melted and transferred into the crucible 36 where it forms a pool of molten metal 44 which progressively freezes to form a solid ingot. The mechanism for driving ram 22 may be of conventional design as also may be the control system for actuating it according to a characteristic of the arc, such mechanism and control systems themselves forming no part of this invention. During the melting operation the average melting rate of electrodes 10 will be automatically equalized and the length of electrodes 10 will be maintained more or less equal.

Metals useful for melting as consumable electrodes according to this invention will be those generally classed as refractory metals including titanium, zirconium, steel, stainless steel, and the so-called super alloys, as well as tantalum, columbium, molybdenum and tungsten.

The following example provides details of an embodiment of this invention employing electrodes of alloy steel.

*Example 1*

Three consumable electrodes of a grade of alloy steel and of sector-shaped cross section are arranged in a cluster with their flat sides in spaced, face to face relation and fixedly attached by their tops to an insulating plate bolted to a support plate which is in turn attached to an electrode drive ram. Each electrode has a cross sectional area of 93 square inches and a length of 115 inches, not including the attaching stub.

The electrode assembly is connected in an enclosed cold mold type arc furnace provided with a ball screw type driving mechanism whose motion is controlled by an electrical system including an amplidyne, responsive to changes in the arc voltage.

The furnace contains a water-jacketed crucible of 28 inches inside diameter.

A three-phase alternating current power supply is connected to the electrodes, one phase being connected to each electrode. The furnace interior is evacuated to a pressure of 25 microns of mercury absolute, the electrode assembly lowered and an arc struck initially between the electrodes and a striker plate in the bottom of the crucible. The metal melting from the electrodes is transferred to the crucible and forms a pool of molten metal which progressively freezes to form a solid ingot. During melting the control system maintains the arc length of the closest electrode or electrodes between about ¾ and 1½ inches. The current drawn is 12,000 amperes measured as line current.

After 3 hours and 20 minutes the power is shut off, the ingot removed from the crucible and the unmelted ends of the electrodes are detached from their assembly mounting. From the weight of the ingot produced the melting rate is calculated at 32 pounds per minute, and the melting rate has been substantially equalized as between the electrodes (within about 5%) since the unmelted portions of the electrodes measure 12, 12 and 8 inches long.

For comparison, a trio of similar shaped and size electrodes of similar alloy composition melted in the same furnace, and under similar conditions, except that the travel of each electrode was individually controlled, showed unmelted electrode lengths of 19, 4 and 13 inches, representing a maximum variation between melted lengths of about 15%.

The method of this invention is useful to equalize the melting rates of electrodes as described above and the electrode assembly is simple and efficient to produce these results. Since only one ram drive is employed and only one control system is needed, the driving and control auxiliaries are reduced in number and simplified. The melting rate equalization is substantially improved over that obtained using much more complex and expensive individual drive and control systems.

This is a continuation-in-part of my application Serial No. 32,949, filed May 31, 1960, now Patent No. 3,080,499.

I claim:

1. A method for equalizing the average melting rate in a trio of metallic consumable electrodes melted in a cold mold type arc furnace by three-phase alternating electric current, such consumable electrodes constituting the meltable charge in said furnace, which comprises: maintaining the tops of said electrodes in fixed horizontal plane relationship with respect to each other and to a common support element and lowering said support element at a rate to maintain an arc to melt at least the electrode closest to the pool of molten metal in the crucible in said furnace while maintaining the tops of said electrodes in substantially their original horizontal plane relationship whereby higher melting rate of one of said electrodes will raise its bottom temporarily above the levels of the bottoms of the others of said electrodes and more electric current will pass between the said others of said electrodes thereby to relatively increase the melting rate of the said others of said electrodes to equalize the average melting rate of said trio of said electrodes.

2. A method for equalizing the average melting rate in a trio of metallic consumable electrodes melted in a cold mold type arc furnace by three-phase alternating electric current, such consumable electrodes constituting the meltable charge in said furnace, which comprises: attaching the tops of said electrodes to a common support element and lowering said support element at a rate to maintain an arc to melt at least the electrode closest to the pool of molten metal in the crucible in said furnace while maintaining the tops of said electrodes in substantially their original horizontal plane relationship whereby higher melting rate of one of said electrodes will raise its bottom temporarily above the levels of the bottoms of the others of said electrodes and more electric current will pass between the said others of said electrodes thereby to relatively increase the melting rate of the said others of said electrodes to equalize the average melting rate of said trio of said electrodes.

3. In a cold mold type arc furnace in which consumable electrodes constitute the meltable charge, a consumable electrode assembly comprising:
    (a) a trio of consumable electrodes of metal to be melted in laterally spaced apart relationship;
    (b) a common support element to which the tops of said electrodes are attached;
    (c) means for insulating the tops of said electrodes from each other and from said support element;
    (d) a drive ram attached to said common support element; and,
    (e) means for connecting one phase of a three-phase alternating current supply to each of said electrodes.

4. In a cold mold type arc furnace in which consumable electrodes constitute the meltable charge, a consumable electrode assembly comprising:
    (a) a trio of consumable electrodes of metal to be melted in clustered and laterally spaced apart relationship;
    (b) a common support element to which the tops of said electrodes are attached;
    (c) means for insulating the tops of said electrodes from each other and from said support element;
    (d) a drive ram attached to said common support element; and,
    (e) means for connecting one phase of a three-phase alternating current supply to each of said electrodes.

5. In a cold mold type arc furnace in which consumable electrodes constitute the meltable charge, a consumable electrode assembly comprising:
    (a) a trio of consumable electrodes of metal to be melted of sector-shaped cross section clustered and spaced apart with their flat faces in face to face relationship;
(b) a common support element to which the tops of said electrodes are attached;
(c) means for insulating the tops of said electrodes from each other and from said support element;
(d) a drive ram attached to said common support element; and,
(e) means for connecting one phase of a three-phase alternating current supply to each of said electrodes.

References Cited in the file of this patent

UNITED STATES PATENTS

| | | |
|---|---|---|
| 1,371,094 | Holslag | Mar. 8, 1921 |
| 2,783,411 | Matulaitis | Feb. 26, 1957 |
| 2,857,445 | Mangin | Oct. 21, 1958 |
| 3,080,499 | Cooper | Mar. 5, 1963 |

FOREIGN PATENTS

| | | |
|---|---|---|
| 2,790 | Great Britain | Feb. 2, 1897 |
| 94,433 | Sweden | Feb. 2, 1939 |
| 645,326 | Great Britain | Oct. 25, 1950 |